United States Patent [19]

Motley et al.

[11] Patent Number: 4,511,782
[45] Date of Patent: Apr. 16, 1985

[54] PLASMA SWEEPER TO CONTROL THE COUPLING OF RF POWER TO A MAGNETICALLY CONFINED PLASMA

[75] Inventors: Robert W. Motley, Princeton; James Glanz, Lawrenceville, both of N.J.

[73] Assignee: The United States of America as represented by the United States Department of Energy, Washington, D.C.

[21] Appl. No.: 436,558

[22] Filed: Oct. 25, 1982

[51] Int. Cl.³ .............................. B23K 9/00; G21B 1/00
[52] U.S. Cl. ......................... 219/121 P; 219/121 PR; 219/121 PW; 376/133; 376/134; 315/111.21
[58] Field of Search ...... 219/121 P, 121 PR, 121 PM, 219/121 PW; 315/111.2; 376/121, 131, 132, 133, 134, 144

[56] References Cited

U.S. PATENT DOCUMENTS

| 3,171,788 | 3/1965 | Gorman et al. | 376/731 |
| 3,663,362 | 5/1972 | Stix | 376/134 |
| 3,914,766 | 10/1975 | Moore | 376/132 |
| 4,292,125 | 9/1981 | Bers | 376/133 |
| 4,330,864 | 5/1982 | Ohyabu | 376/133 |

FOREIGN PATENT DOCUMENTS 2365928  4/1978  France .............................. 376/134

*Primary Examiner*—M. H. Paschall
*Attorney, Agent, or Firm*—Jeannette M. Walder; Paul A. Gottlieb

[57] ABSTRACT

A device for coupling RF power (a plasma sweeper) from a phased waveguide array for introducing RF power to a plasma having a magnetic field associated therewith comprises at least one electrode positioned near the plasma and near the phased waveguide array; and a potential source coupled to the electrode for generating a static electric field at the electrode directed into the plasma and having a component substantially perpendicular to the plasma magnetic field such that a non-zero vector cross-product of the electric and magnetic fields exerts a force on the plasma causing the plasma to drift.

13 Claims, 3 Drawing Figures

PLASMA SWEEPER TO CONTROL THE COUPLING OF RF POWER TO A MAGNETICALLY CONFINED PLASMA

CONTRACTUAL ORIGIN OF THE INVENTION

The U.S. Government has rights in this invention pursuant to Contract No. DE-AC02-76CH03073 between the U.S. Department of Energy and Princeton University.

BACKGROUND OF THE INVENTION

This invention relates to a device for coupling radio-frequency (RF) power to a magnetically confined plasma. RF power is used to excite waves of the frequency corresponding to the lower hybrid resonance of a plasma. RF induced lower hybrid waves can be used to heat or drive current in the plasma. A phased waveguide, such as the one described in U.S. Pat. No. 4,110,595, can be used for launching RF power to heat and drive currents in toroidal plasmas.

The RF waveguide is inserted through the walls of the plasma containment device and is positioned such that the waveguide mouth is near the edge of the plasma (the edge of the plasma is that part of the plasma near the boundary or surface of the plasma). RF coupling depends critically on the electron density immediately in front of the waveguide mouth. In overdense plasmas ($\omega pe^2 >> \omega^2$, where $\omega_{pe}$ is the electron plasma frequency and $\omega$ is the wave frequency) the reflective properties of waveguides operating in the lower hybrid regime of frequencies are essentially determined in the narrow layer near the edge of the plasma, in which $\omega_{pe}^2 \simeq \omega^2$. Density modifications in this critical region may correspondingly have a strong effect on the reflection.

Optimum coupling occurs when $n_e \simeq n_c n_{\parallel}^2$, where $n_e$ is the plasma edge density, $n_c$ is the critical density, and $n_{\parallel}$ is the (parallel) refractive index. Varying the edge density from the optimum by an order of magnitude can increase the power reflection by a factor of 2 to 3 and can lead to waveguide arcing.

Therefore, it is an object of the present invention to improve RF coupling to a magnetically confined plasma.

It is another object of the present invention to modify the edge density of a magnetically confined plasma.

It is yet another object of the present invention to reduce the reflection coefficient of the waveguide and to reduce waveguide arcing when RF power is applied to a magnetically confined plasma.

Additional objects, advantages and novel features of the invention will be set forth in part in the description which follows, and in part will become apparent to those skilled in the art upon examination of the following or may be learned by practice of the invention.

SUMMARY OF THE INVENTION

The present invention uses $\underline{E} \times \underline{B}$ drifts to vary the density of the plasma in the thin (<1 cm) coupling layer to achieve good RF coupling. Since a magnetically confined plasma has a magnetic field $\underline{B}$ associated with it, the present invention applies an electric field $\underline{E}$ to produce a non-zero vector cross product $\underline{E} \times \underline{B}$ which causes the edge plasma to drift. If the electric field $\underline{E}$ is applied near the mouth of a phased waveguide array used to apply RF power to a torodial plasma, plasma near the center of the waveguide is replaced by the lower density plasma near the bottom of the waveguide array. Adjusting the applied electric field $\underline{E}$ adjusts the $\underline{E} \times \underline{B}$ drifts and permits control of the edge plasma density.

In accordance with the purposes of the present invention, a device for coupling RF power (a plasma sweeper) from RF power introducing means to a plasma having a magnetic field associated therewith comprises at least one electrode positioned near the plasma and near the RF power introducing means; and means for generating a static electric field at the electrode directed into the plasma and having a component substantially perpendicular to the plasma magnetic field such that a non-zero vector cross-product of the electric and magnetic fields exerts a force on the plasma causing the plasma to drift. Preferably, the shape of the electrode is long, thin and narrow with rounded edges. The electrode is curved or kidney-shaped in cross-section along the length or longest dimension of the electrode. RF coupling is obtained by varying the edge density of the plasma which is achieved by applying a static electric field in the region where the RF power is applied. In the case of a phased waveguide array, this area is the mouth of the array. Although one electrode will provide a static electric field, more uniform coverage across the mouth of the waveguide array is obtained when two electrodes are used. Preferably, one electrode is positioned on each side of the array mouth.

BRIEF DESCRIPTION OF THE DRAWINGS

The present invention is illustrated in the accompanying drawings wherein.

DESCRIPTION OF THE PREFERRED EMBODIMENT

Figure 1:
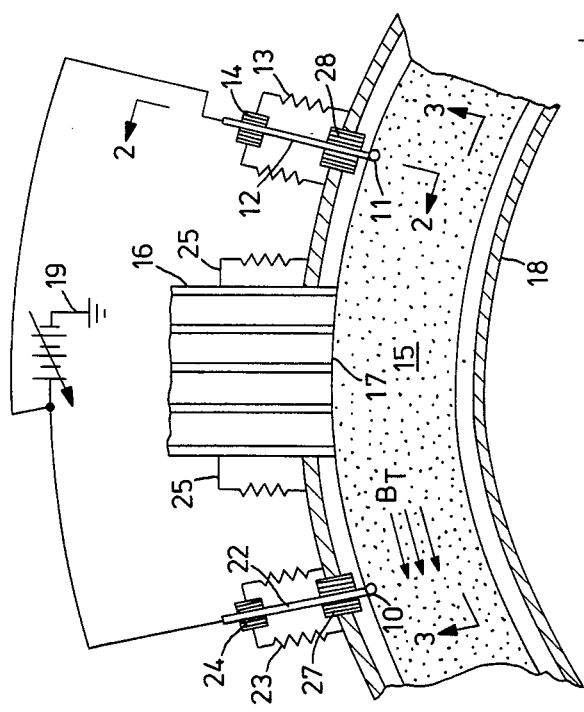
FIG. 1 is a cross-sectional view of a plasma sweeper mounted onto a torodial plasma confinement device.

Referring to FIG. 1, torodial plasma confinement device 18 contains torodial plasma 15. The magnetic field confining plasma 15 has a toroidal component indicated by field lines $B_T$. Phased waveguide array 16 is inserted through an opening in confinement device 18 and is moveably attached to confinement device 18 by bellows 25. Bellows 25 permits the mouth 17 of the waveguide array 16 to be placed within a few millimeters of plasma 15.

Electrodes 10 and 11 are positioned one on each side of waveguide array 16 and slightly in front of mouth 17 (i.e. the electrodes are closer to the plasma 15 than mouth 17). Electrode 10 is inserted through insulated port 27 in confinement device 18 by support bar 22, which is connected to bellows 23 through ceramic insulator 24. Bellows 23 permits radial motion so that electrode 10 can be inserted into the surface or edge of plasma 15. Electrode 10 is positioned slightly in front of mouth 17. Similarly, electrode 11 is inserted through insulated port 28 in confinement device 18 by support bar 12, which is connected to bellows 13 through ceramic insulator 14. Bellows 13 permits radial motion of electrode 11. Source 19 coupled to electrodes 10 and 11 provide positive potential $V_0$ to electrodes 10 and 11.

Figure 3:
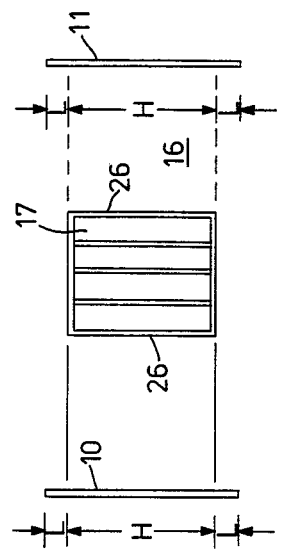
FIG. 3 is a sectional view along line 3—3 of FIG. 1.

FIG. 3 shows the spaced relationship of electrodes 10 and 11 to waveguide mouth 17. Electrodes 10 and 11 are positioned one on each side of waveguide mouth 17; the length of each electrode being sufficient to extend a distance L beyond the walls 26 having height H of array 16. Electrodes 10 and 11 are shown parallel to one another and to walls 26 of array 16.

Figure 2:
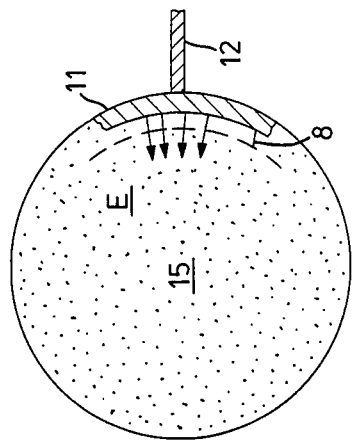
FIG. 2 is a sectional view along line 2—2 of FIG. 1.

Referring to FIG. 2 electrode 11 is shown positioned at the edge of plasma 15 (the electrodes can be positioned just outside of plasma 15 or in the edge region of the plasma). In cross-section electrode 11 is curved or kidney-shaped to match the surface shape of plasma 15. In addition to being kidney-shaped, electrode 11 (and similarly electrode 10) has rounded corners to prevent arcing. Electrodes 10 and 11 can be made of any high temperature conductor. Graphite is preferred because of carbon's low Z. When electric potential $V_0$ is applied to electrode 11 by variable source 19 (not shown in FIG. 2), a static electric field $E$ having essentially horizontal field lines, as shown in FIG. 2, is created, where $$E = -V_0/\delta \tag{1}$$

a distance $\delta$ just outside electrode 11. In response to the crossed electric (E) and magnetic ($B_T$) fields the plasma drifts vertically at a speed $$v_D = c\frac{E}{B_T} \tag{2}$$

where c is the speed of light in the plasma. Plasma near the center of array 16 is replaced by low density plasma near the bottom of array 16 in a time $\tau = H/v_D$ where H is the height of array 16 (length of wall 26). The density of the surface plasma will decrease if $\tau$ is less than the time for replacing the plasma by ionization or by diffusion from the denser plasma core. It was found empirically that $$\delta = \frac{50\sqrt{pA}}{B_T} \text{ cm} \tag{3}$$

where p is the gas pressure in torr, $B_T$ is the magnetic field in kilogauss and A is the atomic mass of the plasma ions. From equations (1), (2), and (3) it can be seen that at constant pressure p and applied potential $V_0$, drift speed $V_D$ is independent of the magnetic field.

EXAMPLE

The plasma sweeper was used on a cylindrical test plasma (2 meters long by 10 centimeters in diameter). The electrodes were positioned 6.7 centimeters from each side of a two element waveguide array. The ends of the two electrodes extended 2-3 mm beyond the array. Potentials up to 40 V were applied to the electrodes after an RF discharge into the plasma (B≃10 kG; $n_e \leq 10^{12}$ cm$^{-3}$). In this experiment $\tau \simeq 60$ μsec if $v_D = \frac{1}{2}$ $C_s$ (sound speed in argon). The density near the waveguide midplane decreased by a factor of 10 within 100 μsec after application of the voltage and was responsible for a decrease in reflectivity by a factor of 2-3.

In this disclosure there is shown and described only the preferred embodiments of the invention, but it is to be understood that the invention is capable of use in other combinations.

The embodiments of this invention in which an exclusive property or privilege is claimed are defined as follows:

1. A device for coupling RF power from RF power introducing means to a plasma, the plasma having a magnetic field associated therewith, comprising:

one or more electrodes positioned near the edge of the plasma and near the RF power introducing means; and means for supplying a positive potential at each electrode for generating a static electric field at each electrode directed into the plasma, each electric field having a component substantially perpendicular to the plasma magnetic field such that a non-zero vector cross-product of the electric and magnetic fields exerts a force on the plasma causing the plasma to drift.

2. The device of claim 1 further including means for varying the position of each electrode radially between the plasma and the mouth of the RF power introducing means.

3. The device of claim 1 wherein the RF power introducing means comprises a phased waveguide array positioned such that the mouth of the array is near the edge of the plasma.

4. The device of claim 3 wherein the length of each electrode is greater than the height of the waveguide, each electrode being positioned in front of the waveguide mouth and to one side of the waveguide, and positioned parallel to the walls of the waveguide such that the ends of each electrode extend beyond the walls of the waveguide.

5. The device of claim 3 wherein each electrode is formed of graphite.

6. The device of claim 4 wherein the shape of each electrode is long, thin and narrow, with rounded corners and being substantially kidney-shaped in cross-section along the longest dimension.

7. The device of claim 6 wherein the means for generating a static electric field comprises a variable potential source coupled to each electrode.

8. A device for coupling RF power to a plasma from a phased waveguide array positioned such that the mouth of the array is near the edge of the plasma, the plasma having a magnetic field associated therewith, comprising:

a pair of electrodes positioned in front of the mouth of the array and spaced about the mouth of the array one on each side of the array; and means for supplying a positive potential at each electrode for generating at a static electric field at the surface of each electrode directed into the plasma, each of said electric fields having a component substantially perpendicular to the plasma magnetic field such that a non-zero vector cross-product of the electric and magnetic fields exerts a force on the plasma causing the plasma to drift.

9. The device of claim 8 further including means for varying the position of the electrode between the plasma and the mouth of the array.

10. The device of claim 9 wherein the length of each electrode is greater than the length of the wall of the array that it is positioned near and wherein the electrodes are positioned parallel to one another such that the ends of the electrodes extend beyond the walls of the waveguide.

11. The device of claim 10 wherein the electrodes are formed of graphite.

12. The device of claim 11 wherein the shape of the electrodes is long, thin, and narrow, with rounded corners and having a substantially kidney-shaped cross-section along the longest dimension.

13. The device of claim 12 wherein the means for generating a static electric field comprises a variable potential source coupled to the electrodes to provide the same potential to each electrode.

* * * * *